(12) United States Patent
Itkin

(10) Patent No.: US 12,196,848 B2
(45) Date of Patent: Jan. 14, 2025

(54) RADAR APPARATUS AND METHOD

(71) Applicant: Infineon Technologies AG, Neubiberg (DE)

(72) Inventor: Grigory Itkin, Munich (DE)

(73) Assignee: Infineon Technologies AG, Neubiberg (DE)

( * ) Notice: Subject to any disclaimer, the term of this patent is extended or adjusted under 35 U.S.C. 154(b) by 305 days.

(21) Appl. No.: 17/929,190

(22) Filed: Sep. 1, 2022

(65) Prior Publication Data

US 2023/0083878 A1    Mar. 16, 2023

(30) Foreign Application Priority Data

Sep. 15, 2021  (DE) .......................... 102021123897.8
Jun. 29, 2022  (DE) .......................... 102022116281.8

(51) Int. Cl.
*G01S 13/58*    (2006.01)
*G01S 7/35*     (2006.01)

(52) U.S. Cl.
CPC ............ *G01S 13/588* (2013.01); *G01S 7/358* (2021.05); *G01S 13/583* (2013.01)

(58) Field of Classification Search
CPC ....... G01S 13/583; G01S 13/588; G01S 7/358
USPC .............................. 342/93, 128, 59, 104, 129
See application file for complete search history.

(56) References Cited

U.S. PATENT DOCUMENTS

| | | |
|---|---|---|
| 4,176,351 A | 11/1979 | DeVita et al. |
| 4,389,649 A | 6/1983 | Parkhurst et al. |
| 4,620,192 A | 10/1986 | Collins |
| 9,945,945 B2 | 4/2018 | Houshuyama et al. |
| 10,371,800 B2 * | 8/2019 | Huemer ................ G01S 7/4056 |
| 10,670,698 B2 * | 6/2020 | Melzer ................ G01S 7/4008 |
| 10,908,272 B2 * | 2/2021 | Rao .......................... G01S 13/34 |
| 2001/0052872 A1 * | 12/2001 | Hahlweg ................ G01S 17/95 |
| | | 342/128 |
| 2009/0085797 A1 | 4/2009 | Wise et al. |
| 2009/0251360 A1 * | 10/2009 | Uebo ...................... G01S 13/32 |
| | | 342/129 |

(Continued)

FOREIGN PATENT DOCUMENTS

| | | |
|---|---|---|
| DE | 3435949 C2 | 8/1995 |
| JP | 2020-169983 A | 10/2020 |
| WO | 2018/050913 A1 | 3/2018 |

OTHER PUBLICATIONS

"Continuous-wave radar." Wikipedia, Wikimedia Foundation, 10 pages. [Retrieved on Apr. 12, 2021 from https://en.wikipedia.org/wiki/Continuous-wave_radar].

*Primary Examiner* — Bo Fan
(74) *Attorney, Agent, or Firm* — Harrity & Harrity, LLP

(57) ABSTRACT

The present disclosure relates to a radar apparatus including a transmitter for transmitting a frequency-modulated continuous-wave radar signal, wherein the transmitter is configured to generate the continuous-wave radar signal with a sinusoidally varying modulation frequency, a receiver for receiving a reflection signal of the frequency-modulated continuous-wave radar signal, which is reflected by at least one object, and for mixing the reflection signal with the frequency-modulated continuous-wave radar signal in order to obtain a downmixed reception signal, and a device for correlating the downmixed reception signal with at least one pattern signal which is based on the modulation frequency and a predetermined distance.

28 Claims, 12 Drawing Sheets

(56) References Cited

U.S. PATENT DOCUMENTS

2012/0169528 A1 7/2012 Edvardsson et al.
2020/0363521 A1 11/2020 Sautermeister et al.

\* cited by examiner

RADAR APPARATUS AND METHOD

CROSS REFERENCE TO RELATED APPLICATIONS

This application claims priority to German Patent Application No. 102021123897.8 filed on Sep. 15, 2021, and German Patent Application No. 102022116281.8 filed on Jun. 29, 2022, the content of which are incorporated by reference herein in their entirety.

TECHNICAL FIELD

The present disclosure deals with radar apparatuses and radar methods and, in particular, with radar apparatuses and radar methods for frequency-modulated continuous-wave radar signals.

BACKGROUND

Numerous radar systems currently use a linear FMCW modulation scheme (FMCW=frequency modulated continuous wave). If an error caused by a Doppler frequency ($f_D$) can be ignored, a magnitude of the frequency spacing $\Delta f$ between the transmission signal and the reception signal at any time is a measure of the propagation time ($\Delta t$) and therefore of the distance in the case of linear frequency modulation of a transmission signal. However, linearly FMCW-modulated radar devices require additional time for so-called fly-back, in order to fly back to the starting frequency of the next chirp or sweep, and PLL (Phase-Locked Loop) transient responses, which time is not used for measurement, but consumes power (temperature increase).

In the case of short chirps (for example 5-10 μs), the unused time may account for up to 40% of the total time of a chirp. Although the unused time can be reduced using successive linear up-chirps and down-chirps, it is still required. The rapid change of the modulation frequency from a linear up-chirp to a linear down-chirp is a great challenge for the PLL and all other analog circuit parts in a radar transceiver.

There is therefore a need for alternative or improved concepts for FMCW radar systems.

SUMMARY

This need is taken into account by apparatuses and methods according to the independent patent claims. The dependent claims relate to advantageous developments.

A first aspect of the present disclosure proposes a radar apparatus, in particular an FMCW radar apparatus. The proposed radar apparatus includes a transmitter for transmitting a frequency-modulated continuous-wave radar signal. In this case, the transmitter is configured to generate the continuous-wave radar signal with a sinusoidally varying modulation frequency. In particular, the modulation frequency can vary continuously in a sinusoidal manner. It is therefore not a linear FMCW modulation scheme, but rather a sinusoidal FMCW modulation scheme in which the frequency change in the emitted radar signal is sinusoidal in the measurement intervals provided, that is to say follows a sinusoidal waveform based on time. The proposed radar apparatus also includes a receiver for receiving a reflection signal of the frequency-modulated continuous-wave radar signal, which is reflected by at least one object, and for mixing the reflection signal with the frequency-modulated continuous-wave radar signal in order to obtain a downmixed reception signal (beat frequency signal). In this case, the downmixed reception signal can also be considered to be a baseband signal. The proposed radar apparatus also includes a device for correlating the downmixed reception signal with at least one pattern signal which is based on the modulation frequency and a predetermined distance. In other words, the pattern signal may be based on the modulation frequency and a signal propagation time corresponding to the predetermined distance. The at least one pattern signal is therefore predetermined and may correspond to a downmixed reception signal assuming a reflective target at the predetermined distance.

According to some example implementations, the correlating device is configured to determine a correlation result for the pattern signal correlated with the downmixed reception signal and to determine a target object at the predetermined distance based on the correlation result. For example, a target object may be determined at the predetermined distance if the corresponding correlation result exceeds a predetermined threshold value.

According to some example implementations, the frequency-modulated continuous-wave radar signal can be subdivided into successive chirp intervals. The chirp intervals or boundaries between chirp intervals can be freely selected and are not tied to conventional rising or falling frequency ramps. A chirp interval means an interval of time of the frequency-modulated continuous-wave radar signal that is used to measure distance. That is to say, the (received) frequency-modulated continuous-wave radar signal is subjected to signal processing in a chirp-by-chirp manner in order to determine distances of target objects. In this case, the correlating device may be configured to determine distance bins corresponding to target objects for each chirp interval (each distance bin corresponds to a predetermined distance).

According to some example implementations, the correlating device is configured to subdivide the frequency-modulated continuous-wave radar signal into continuously successive chirp intervals. The interval length of a chirp may be, for example, half a sine interval or a complete sine interval. Example implementations generally make it possible to select chirp intervals and their boundaries in any desired manner.

According to some example implementations, the radar apparatus also includes a device for determining speed information relating to the target objects, which device is configured to determine the speed information based on phase information for the determined distance bins. A Doppler frequency and therefore a relative speed of a target object with respect to the radar apparatus can be inferred based on the phase information, for example.

According to some example implementations, the frequency-modulated continuous-wave radar signal can be subdivided into successive chirp intervals which can be selected as desired. The downmixed reception signal and the pattern signal for a chirp interval may each have a number (N) of samples which differs from a power of 2. This distinguishes the proposed concept from conventional FFT-based signal processing concepts in which a number of samples for each chirp interval must be a power of 2 ($2^n$) on account of the FFT. The chirp intervals which can be selected as desired and therefore also the samples per chirp which can be selected as desired enable a high degree of flexibility when determining distance. Furthermore, it is possible to save time and energy.

According to some example implementations, the transmitter has a phase-locked loop (PLL) which has a carrier frequency signal modulated with the modulation frequency as an input signal and is configured, on the basis thereof, to output the frequency-modulated continuous-wave radar signal as a transmission signal.

According to some example implementations, the transmitter has a phase-locked loop (PLL) which has a carrier frequency signal as an input signal and is configured, on the basis thereof, to output an RF signal at the carrier frequency. An IQ modulator may be configured to modulate the RF signal with the modulation frequency and to generate the frequency-modulated continuous-wave radar signal on the basis thereof. The frequency modulation inside the IQ modulator may entail some additional advantages since the PLL itself only has to generate a carrier frequency and can be optimized for the best noise behavior.

According to some example implementations, a plurality of pattern signals (pattern signal matrix) corresponds to a distance range from a starting distance to an end distance. Each pattern signal of the plurality of pattern signals in this case corresponds to a different predetermined distance in the distance range. In this case, the pattern signals can be selected according to a desired distance range (to be tested) and/or a desired distance resolution. The correlating device may be configured, for example, to use a second plurality of pattern signals differing from a first plurality to vary a distance range and/or a distance resolution formed by the respective pattern signals. It therefore becomes possible, for example, to carry out an additional multiplication/correlation of already available IF samples (downmixed reception signal) by/with a new pattern signal matrix corresponding to predetermined distances around a detected object in order to obtain more information (for example better resolution). This multiplication can be carried out in the background in parallel with current or new measurements, for example.

According to some example implementations, the correlating device is configured to correlate the downmixed reception signal (IF samples) for a first distance range with pattern signals (for example first pattern signal matrix) corresponding to a first distance resolution and for a second distance range with pattern signals (for example second pattern signal matrix) corresponding to a second distance resolution. For example, the first distance range may be a close range and the second distance range may be a far range. The first distance resolution may be higher than the second distance resolution. As a result, target objects can be resolved more finely in the usually more relevant close range than in the usually less relevant far range.

According to some example implementations, a (distance) grid corresponding to the pattern signals is not equidistant. Each pattern signal of a plurality of pattern signals respectively corresponds to a predetermined distance (or a corresponding delay time τ). If adjacent predetermined distances of the plurality always have the same distance spacing (or delay time spacing) from one another, this is referred to as an equidistant (distance) grid. If adjacent predetermined distances of the plurality have different distance spacings (or delay time spacings) from one another, this is referred to as a non-equidistant (distance) grid. The distance spacings of the pattern signals may therefore increase, for example, from a close range to a far range (for example in sections or semi-logarithmically).

According to some example implementations, the frequency-modulated continuous-wave radar signal can be subdivided into successive chirp intervals which can be selected as desired. The correlating device may be configured to correlate the downmixed reception signal of a chirp interval with pattern signals (first pattern signal matrix) corresponding to a first (distance) grid in order to obtain a first estimation of target objects and, after the first estimation of target objects, to adapt a (distance) grid of the pattern signals to target objects which were determined during the first estimation. For example, the first estimation may be a rough estimation in terms of distance with relatively little signal processing effort. If target objects at respective roughly determined distances are detected in this case, a distance resolution in the range of the roughly determined distances may be increased in a second, finer estimation. For this purpose, the correlating device may be configured to compress a (distance) grid in a predefined distance range around a determined target object in comparison with the first estimation (for example second pattern signal matrix).

According to some example implementations, the correlating device is configured to correlate the downmixed reception signal of a chirp interval directly or indirectly following the chirp interval in a distance range around a target object determined in the first estimation (for example first pattern signal matrix) with further pattern signals (for example second pattern signal matrix) corresponding to a second (distance) grid which corresponds to a finer distance resolution than the first (distance) grid.

According to some example implementations, the correlating device is configured to correlate the downmixed reception signal of a chirp interval with first pattern signals (for example first pattern signal matrix) corresponding to a first distance range and a first (distance) grid and with at least second pattern signals (for example second pattern signal matrix) corresponding to a second distance range and a second (distance) grid. The correlation with the first and second pattern signals can take place in a parallel manner in terms of time. A plurality of pattern signal matrices can therefore be used in a parallel manner (that is to say for a chirp interval). It therefore becomes possible to combine different (distance) resolutions with a downmixed reception signal corresponding to a chirp. Conventional solutions require a large number of samples in order to cover the same functionality.

According to some example implementations, the downmixed reception signal has a first quadrature component (for example sin) and a second quadrature component (for example cos). The pattern signal has a first quadrature component (for example sin) and a second quadrature component (for example cos). The correlating device may be configured to determine a first quadrature component (for example sin) of a correlation signal and a second quadrature component (for example cos) of the correlation signal based on a combination or linking of the quadrature components of the downmixed reception signal and of the pattern signal.

According to some example implementations, the correlating device is configured to determine the first quadrature component of the correlation signal based on a difference between a first product of the first quadrature component of the pattern signal and the second quadrature component of the downmixed reception signal and a second product of the second quadrature component of the pattern signal and the first quadrature component of the downmixed reception signal and to determine the second quadrature component of the correlation signal based on a sum of a first product of the first quadrature component of the pattern signal and the first quadrature component of the downmixed reception signal and a second product of the second quadrature component of the pattern signal and the second quadrature component of the downmixed reception signal.

According to some example implementations, the correlating device is configured to determine the amplitude and phase of the correlation signal based on the first and second quadrature components of the correlation signal. The amplitude and phase of the correlation signal can then be used further, for example, in order to infer target objects and their (relative) speed.

According to some example implementations, the correlating device is configured to calculate the correlation signals for a plurality of pattern signals for different predefined distances in a parallel manner. It is therefore possible to determine target objects at different distances in a parallel manner.

According to some example implementations, the radar apparatus includes a memory for digital samples of the downmixed reception signal. As a result, the downmixed reception signal can be buffered and correlated with different pattern signals. For this purpose, the correlating device may be configured to multiply samples of the downmixed reception signal by samples of a plurality of pattern signals for different predefined distances in order to obtain respective correlation signals.

According to some example implementations, the samples of the pattern signals for different predefined distances are calculated during operation of the radar apparatus for each of the different predefined distances. According to alternative example implementations, the radar apparatus includes a memory for previously determined samples of the pattern signals for different predefined distances for each of the different predefined distances.

According to some example implementations, the modulation frequency is based on the following representation.

$$FM\_sin\_TX = BW\_slope * \cos(2*\pi*F\_mod*t + start\_phase),$$

where BW_slope signifies an amplitude of the modulation frequency (frequency swing), F_mod signifies a rate of change (slope of the frequency change) of the modulation frequency, and start_phase signifies an initial phase of the modulation frequency. The frequency swing may be several gigahertz, for example. The slope of the frequency change influences the resolution of the FMCW radar. Since, however, the bandwidth of the receiver then limits the maximum possible frequency change at the same time, it is necessary to find a compromise between resolution and range.

According to some example implementations, the frequency-modulated continuous-wave radar signal is based on the following representation:

$$TX\_RF = \exp(j*2*\pi*(F\_RF + FM\_sin\_TX)*t),$$

where F_RF signifies a carrier frequency of the frequency-modulated continuous-wave radar signal.

According to some example implementations, the pattern signal is based on the following representation:

$$TX\_corr = \exp(-j*2*\pi*FM\_sin\_TX*\tau),$$

where τ signifies the signal propagation time corresponding to the predefined distance. The pattern signal is therefore predetermined by the modulation frequency and the distance and may correspond to an (ideal) downmixed reception signal, assuming a reflective target at the predetermined distance.

A generalizing aspect of the present disclosure proposes a radar apparatus including a transmitter for transmitting a frequency-modulated continuous-wave radar signal, wherein the transmitter is configured to generate the continuous-wave radar signal with a continuously varying modulation frequency corresponding to a signal waveform which has a constant time derivative within a measurement interval. It therefore does not necessarily have to be a sinusoidally varying modulation frequency. It suffices if the modulation frequency is a differentiable function. For example, a combination of a sinusoidal frequency change and a temporally very slow frequency change may be used. A measurement interval typically includes a plurality (for example 2, 4, 8, 16, . . . ) of local maxima and minima of the signal waveform of the modulation frequency, wherein the signal waveform can also be temporally derived at the local maxima and minima and therefore does not have any abrupt direction change. Otherwise, the radar apparatus includes a receiver for receiving a reflection signal of the frequency-modulated continuous-wave radar signal, which is reflected by at least one object, and for mixing the reflection signal with the frequency-modulated continuous-wave radar signal in order to obtain a baseband signal, and a device for correlating the baseband signal with at least one pattern signal which is based on the modulation frequency and a predetermined distance. The pattern signal is therefore predetermined by the continuous differentiable modulation frequency function and the distance and may correspond to an (ideal) downmixed reception signal, assuming a reflective target at the predetermined distance.

A further aspect of the present disclosure proposes a radar method including transmitting a frequency-modulated continuous-wave radar signal at a sinusoidally varying modulation frequency, receiving a reflection signal of the frequency-modulated continuous-wave radar signal, which is reflected by at least one object, mixing the reflection signal with the frequency-modulated continuous-wave radar signal in order to obtain a downmixed reception signal, and correlating the downmixed reception signal with at least one pattern signal which is based on the modulation frequency and a predetermined distance.

In example implementations, the present disclosure proposes use of sinusoidally modulated FMCW radar signals instead of linearly modulated FMCW radar signals. This replacement can entail several advantages, for example the elimination of the fly-back and the transient recovery time between successive chirps, the simplification of analog units (PLL), a reduction in energy supply requirements and some other advantages which are described below.

BRIEF DESCRIPTION OF THE DRAWINGS

Some examples of apparatuses and/or methods are explained merely by way of example in more detail below with reference to the accompanying figures, in which.

DETAILED DESCRIPTION

Frequency-modulated continuous-wave radar (FMCW radar) is a special type of radar sensor which, like a simple continuous-wave radar (CW radar), emits a continuous transmission signal. In contrast to CW radar, an FMCW radar can change its operating frequency during the measurement: that is to say, the frequency of the transmission signal is modulated. These changes in the frequency mean that additional measurement possibilities as a result of propagation time measurements become technically possible in the first place. If the frequency change is linear over a wide range, the distance can be determined within this range using a frequency comparison Δf of the transmission signal and the reception signal. As a result of the fact that only the magnitude of the difference frequency can be measured, the results in the case of a linearly rising frequency change are the same as a falling frequency change in a static scenario.

Figure 1A:
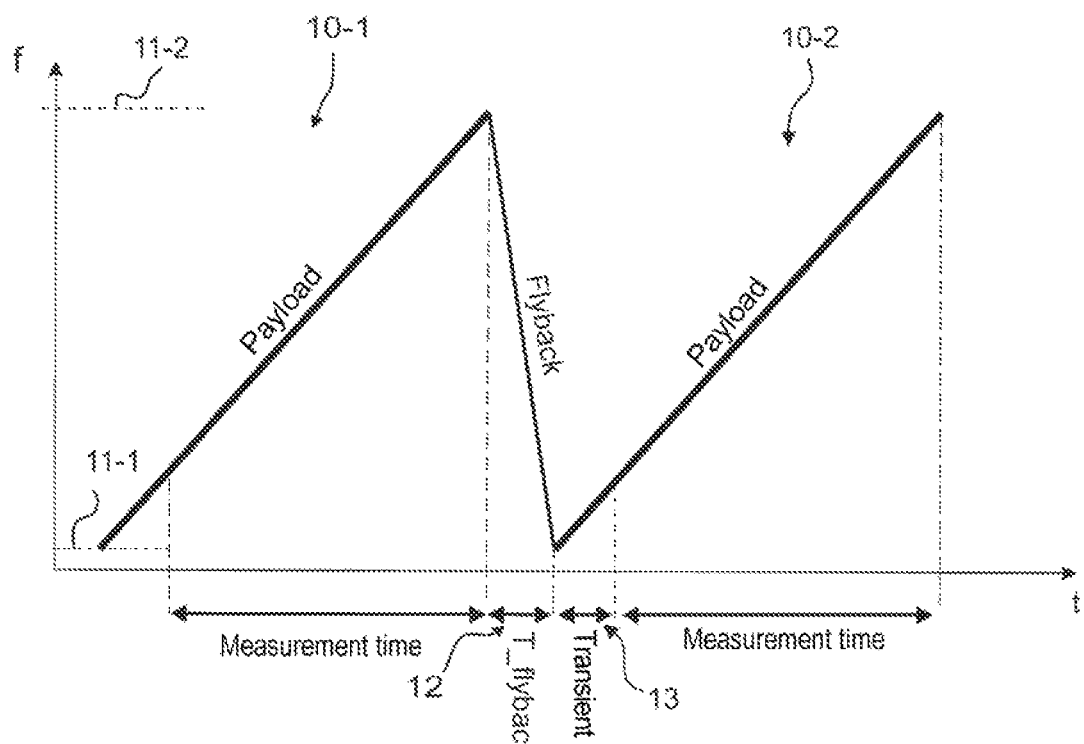
FIGS. 1A and 1B schematically show two successive chirps of a linearly frequency-modulated continuous-wave radar signal.

FIG. 1A schematically shows two successive up-chirps or upward ramps 10-1, 10-2 of a linearly frequency-modulated continuous-wave radar signal. FIG. 1A shows sawtooth-shaped frequency modulation. In upward ramp 10-1, the operating frequency of the continuous-wave radar signal increases linearly from a lower starting value 11-1 to an upper end value 11-2. In a so-called fly-back time interval 12, the frequency is reset from the upper end value 11-2 to the lower starting value 11-1 again for the next upward ramp 10-2. In upward ramp 10-2, the operating frequency of the continuous-wave radar signal linearly increases again from the lower starting value 11-1 to the upper end value 11-2, etc. The fly-back time interval 12 and additional transient recovery times 13 of PLLs cannot be used for measurements, but consume power. Such unused time intervals can occupy up to 40% of the total time in the case of short ramps or chirps (for example 5-10 µs).

Figure 1B:
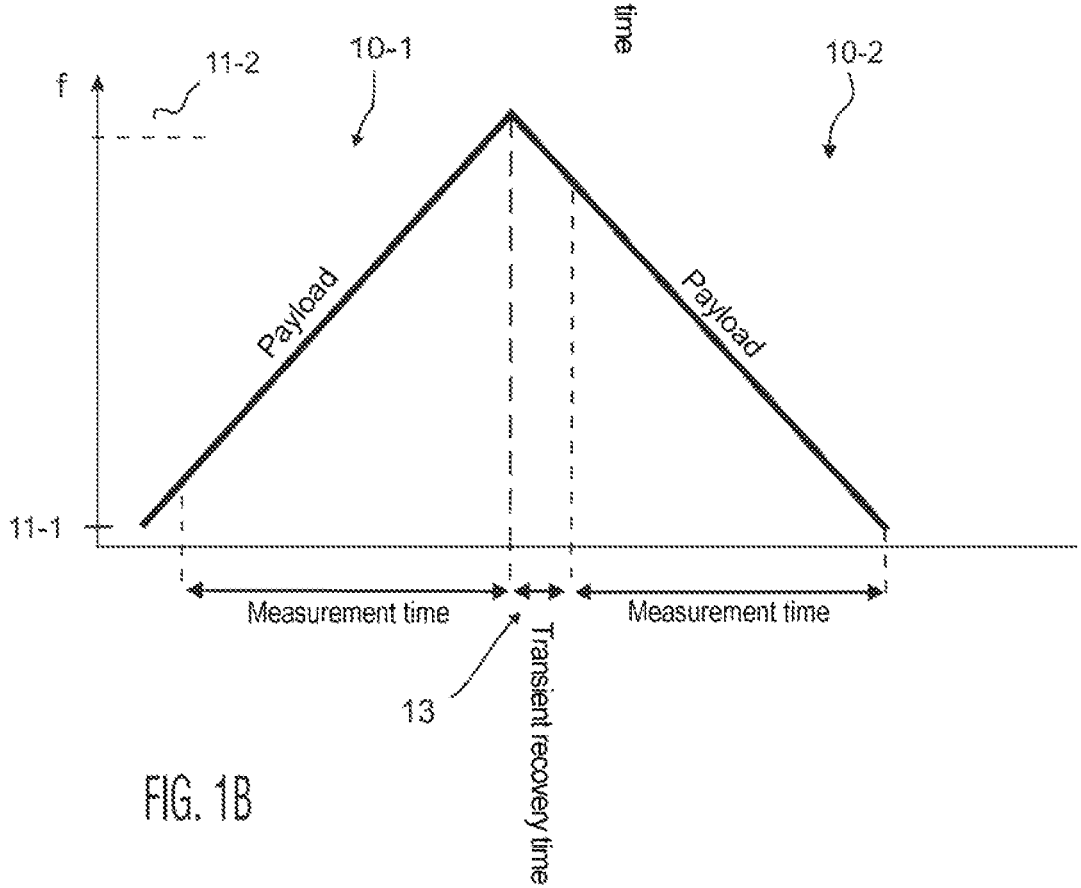

The unused periods of time 12, 13 can be reduced by combining an upward ramp and a downward ramp. FIG. 1B schematically shows an upward ramp 10-1 and an immediately following downward ramp 10-2 of a linearly frequency-modulated continuous-wave radar signal. FIG. 1B shows triangular frequency modulation. During the upward ramp 10-1, the operating frequency of the continuous-wave radar signal linearly increases from the lower starting value 11-1 to the upper end value 11-2. During the downward ramp 10-2 which immediately follows the upward ramp 10-1, the operating frequency of the continuous-wave radar signal linearly falls from the upper end value 11-2 (starting value for downward ramp 10-2) back to the lower starting value 11-1 again (end value for downward ramp 10-2). Although the unused time can be reduced by using successive upward and downward ramps, it is still required on account of the transient recovery times 13 of the PLLs. An abrupt or fast change of the modulation frequency from the upward ramp 10-1 to the downward ramp 10-2 is a great challenge for the PLL and all other analog circuits.

Figure 2:
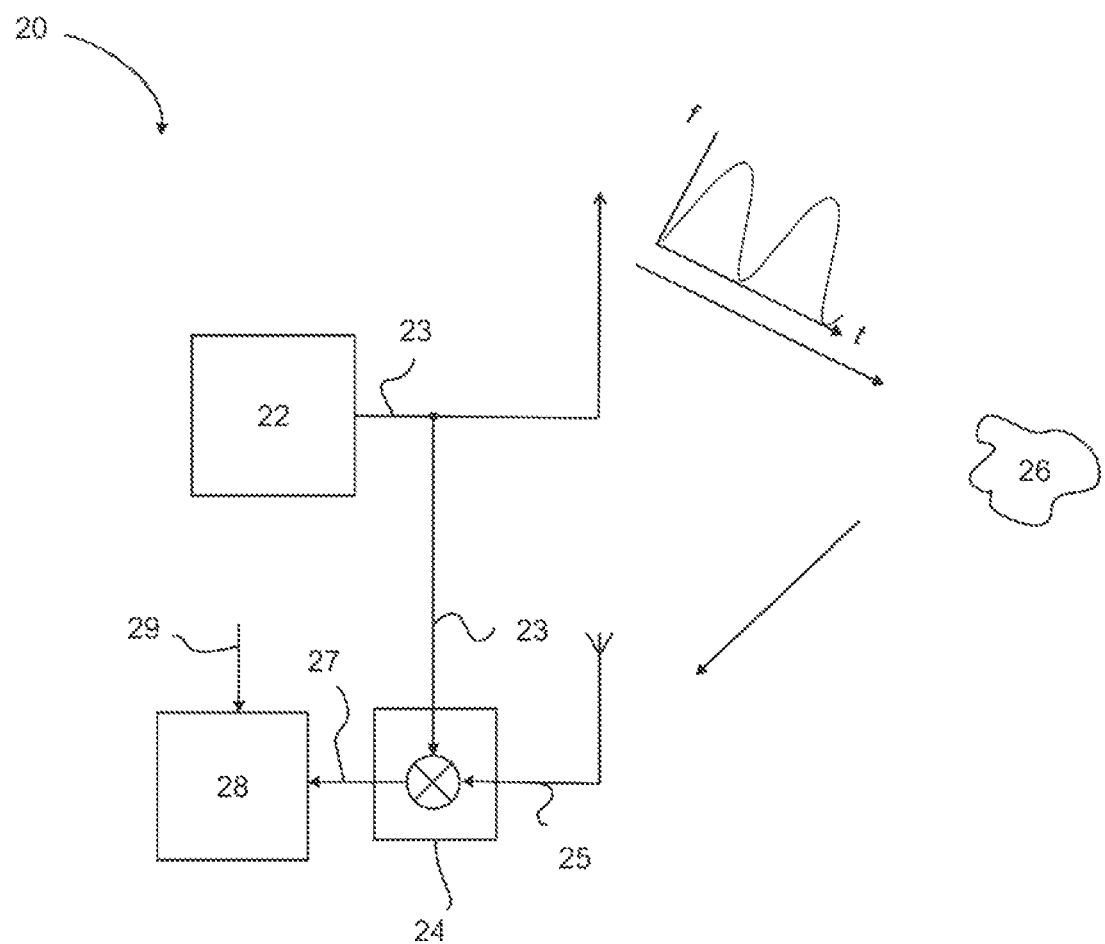
FIG. 2 shows a block diagram of a radar apparatus according to one example implementation of the present disclosure.

In order to eliminate or reduce such disadvantages, FIG. 2 schematically shows a radar apparatus 20 according to one example implementation of the present disclosure.

The radar apparatus 20 is likewise an FMCW radar apparatus. It comprises a transmitter 22 for transmitting a frequency-modulated continuous-wave radar signal 23. However, in this case, the transmitter 22 is configured to generate the continuous-wave radar signal 23 with a sinusoidally varying modulation frequency instead of with a linearly varying modulation frequency. This may entail several advantages, for example the elimination of fly-back and the transient recovery time between individual ramps or chirps, a simplification of analog circuit components (for example PLL), a reduction in the filtration requirements of the power supply requirement (interference signals) and some other advantages. The transmitter 22 may comprise typical digital and analog circuit components, for example a local oscillator (LO), a PLL, digital/analog converters (DACs), transmission amplifiers, transmission antennas, etc.

The radar apparatus 20 also comprises a receiver 24 which is coupled to the transmitter 22 and is intended to receive a reflection signal 25 of the frequency-modulated continuous-wave radar signal 23, which is reflected by at least one object 26 remote from the radar apparatus 20. The receiver 24 is also used to mix the reflection signal 25 with the transmitted frequency-modulated continuous-wave radar signal 23 order to obtain a downmixed reception signal (beat signal) 27. The receiver 24 may comprise typical digital and analog circuit components, for example at least one reception antenna, a low-noise reception amplifier (LNA), analog/digital converters (ADCs), analog or digital mixer stages, etc. A baseband signal 27 containing information relating to the distance and relative speed of the object 26 is obtained by mixing the reflection signal 25 with the transmission signal 23. However, in order to obtain this information, signal processing of a conventional linearly frequency-modulated FMCW radar system is modified. For this purpose, the radar apparatus 20 comprises a device 28 for correlating the downmixed reception signal or baseband signal 27 with at least one pattern signal 29 which is based on the sinusoidally varying modulation frequency and a predetermined distance (to be tested). The pattern signal 29 is based on a distance to be tested by virtue of a time delay caused by the distance (propagation time of the radar signal back and forth) being taken into account as a corresponding time shift. The pattern signal may correspond, for example, to the sinusoidally varying modulation frequency signal, but with an additional predetermined phase shift which depends on the distance (to be tested). A pattern signal which corresponds to a short distance therefore has a time shift with respect to the signal profile of the modulation frequency that is shorter than a time shift of a pattern signal corresponding to a greater predetermined distance. For this purpose, the device 28 may have substantially digital circuit components for processing digital (baseband) signals.

Figure 3:
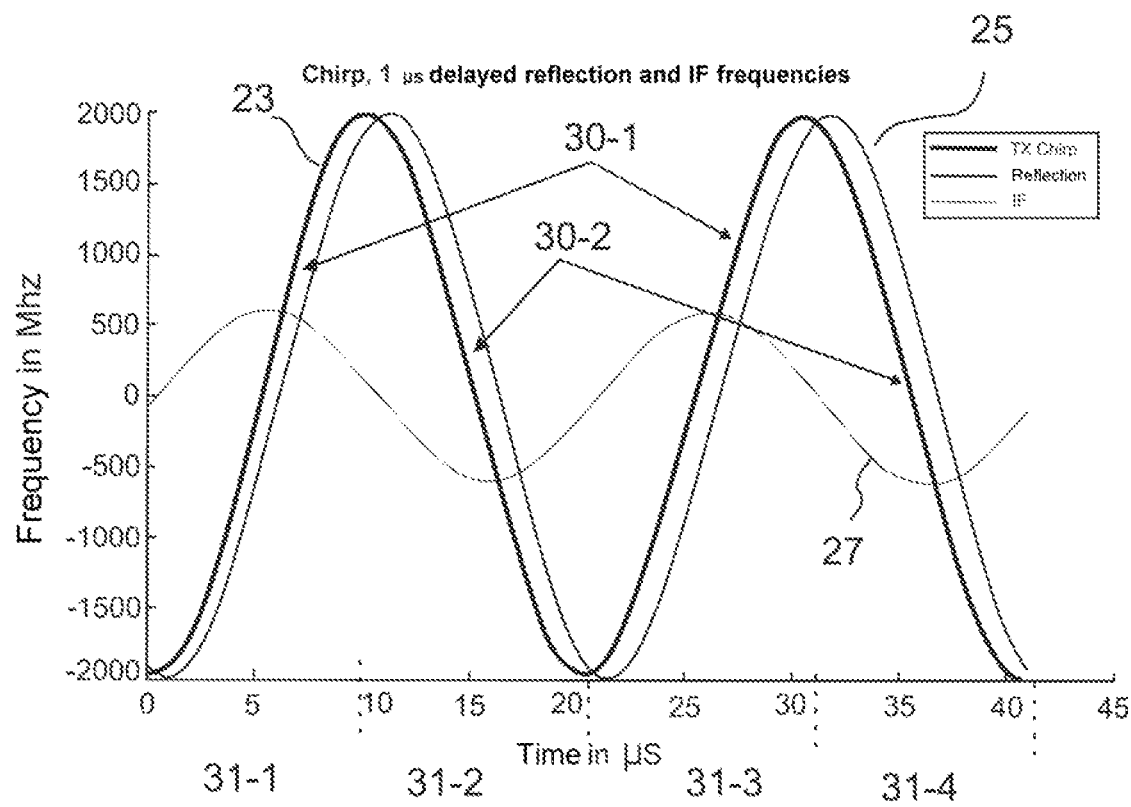
FIG. 3 shows a sinusoidally frequency-modulated continuous-wave radar signal according to one example implementation of the present disclosure.

A core concept of the present disclosure is illustrated in FIG. 3. The modulation frequency of the frequency-modulated continuous-wave radar signal 23 is changed from a linear form to a sin form or cos form. It should be noted that this need not necessarily be a sinusoidally varying modulation frequency. Other modulation frequencies which vary continuously over time (differentiable functions) are likewise conceivable (for example Hamming window functions, modulation frequencies which vary in a Gaussian manner, etc.). However, known sawtooth or triangular shapes do not comply with this continuity property.

As illustrated by way of example in FIG. 3, upward ramps 30-1 and downward ramps 30-2 of the sinusoidally frequency-modulated continuous-wave radar signal 23 may follow one another directly and continuously or constantly. No fly-back times are therefore required. On account of the continuity of the modulation frequency, a frequency transition from upward ramps 30-1 to downward ramps 30-2 is very gentle. Therefore, there is no need for any PLL transient recovery time or other transient recovery times. A PLL without fast fly-back can be implemented more easily and manages with a narrowband control circuit, which can be used to simplify the implementation, reduce the power consumption and optimize the noise behavior.

FIG. 3 shows the sinusoidally frequency-modulated continuous-wave radar signal 23 subdivided into successive chirp intervals 31. A chirp interval means an interval of time of the frequency-modulated continuous-wave radar signal that is used to measure distance. The sinusoidally frequency-modulated continuous-rave radar signal 23 is shown in a simplified manner here around a center frequency of 0 MHz. In reality, the center frequency may be a carrier frequency of 77 GHz or 79 GHz, for example. FIG. 3 therefore shows the deviation of the frequency of the emitted radar signal from a center frequency, for example 77 GHz or 79 GHz. A first chirp interval 31-1 comprises a first upward ramp 30-1. A second chirp interval 32-2 comprises a first downward ramp 30-2. A third chirp interval 31-3 comprises a second upward ramp 30-1. A fourth chirp interval 31-4 comprises a second downward ramp 30-2. The first sinusoidal upward ramp 30-1 from a minimum modulation frequency (here: −2 GHz) to a maximum modulation frequency (here: +2 GHz) is followed directly and continuously by the first sinusoidal downward ramp 30-2 from the maximum modulation frequency to the minimum modulation frequency. The first sinusoidal downward ramp 30-2 is followed directly and continuously by the second sinusoidal upward ramp 30-1 and the second sinusoidal downward ramp 30-2, etc. In contrast to linearly modulated frequency ramps in FIGS. 1A, 1B, the modulation frequency is constant here, that is to say it can be differentiated at any point. At the boundaries between the example chirp intervals, a derivative of the modulation frequency is zero, with the result that no fly-back is required. It should be noted at this point that, in example implementations, boundaries between chirps can be selected in any desired manner. The chirp boundaries at the maxima and minima of the modulation frequency, as illustrated in FIG. 3, are merely examples. Therefore, example implementations can be adapted very flexibly to respective intended purposes of the radar apparatus 20 in order to achieve a high distance resolution or a high speed resolution, for example. For this purpose, the amplitude and frequency of the modulation frequency can be varied according to the measurement situation.

In addition to the sinusoidally frequency-modulated continuous-wave radar signal 23, FIG. 3 also schematically shows a time-shifted reflection signal 25 (here shifted by 1 μs, for example). The time shift (here: 1 μs) of the reflection signal 25 with respect to the transmission signal 23 results from the signal propagation time to the object 26 and back and is therefore proportional to the distance between the object 26 and the radar apparatus 20.

FIG. 3 also shows the downmixed reception signal or baseband signal 27 which results from the mixing of the two signals 23 and 25 and occasionally is also referred to as the beat frequency signal. In contrast to linearly frequency-modulated continuous-wave radar signals, the frequency of the baseband signal 27 is not constant, but varies depending on the sinusoidal modulation frequency and the distance between the object 26 and the radar apparatus 20. In the case of a plurality of objects, this results in a superimposition of a plurality of respective beat frequency signals.

The distance between the object 26 and the radar apparatus 20 can be inferred by correlating the baseband signal 27 with the already mentioned predetermined pattern signals (one for each discrete distance to be tested). The correlations may be carried out for each chirp (that is to say in a chirp-by-chirp manner), for example, in order to determine distances from target objects. For this purpose, each chirp may be subdivided, for example, into a number of N sampling intervals (fast time), with the result that N digital samples can be obtained for each chirp for the baseband signal 27. For each chirp, the digital baseband signal 27 can then be correlated with the digital pattern signals 29 (N samples in each case) for the distances to be tested. In the present case, $N \neq 2^n$. A number of samples of the baseband signal 27 and of the pattern signals 29 for a chirp interval may therefore differ from a power of 2. Clearly, the distance for which the respective pattern signal 29 is correlated with the baseband signal 27 is checked. If a correlation value is high enough, it is possible to assume an object at the respective distance. The correlating device 28 may therefore be configured to determine distance bins (corresponding to the distances to be tested) corresponding to target objects 26 for each chirp interval.

Figure 4A:
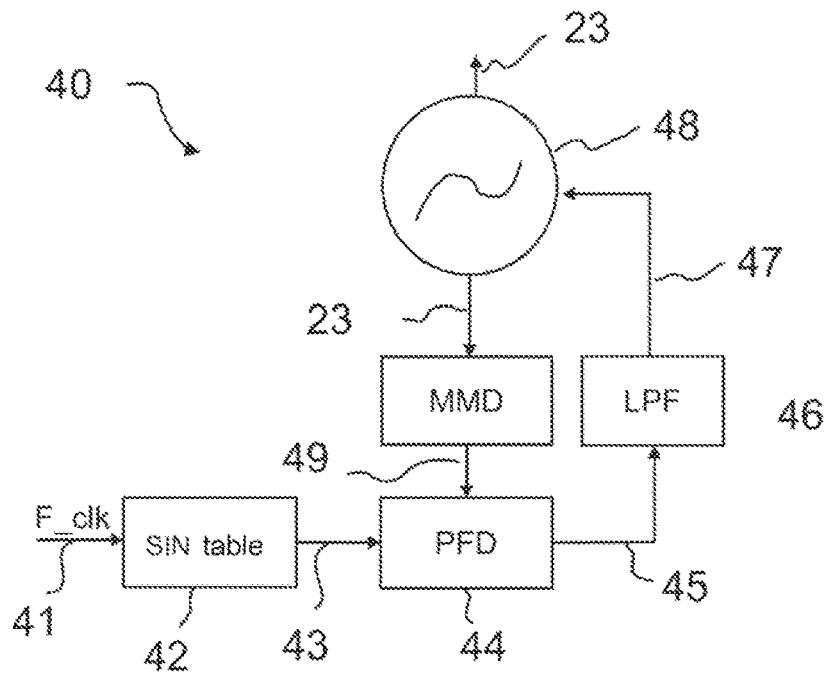
FIGS. 4A and 4B show different PLL and modulation concepts.
Figure 4B:
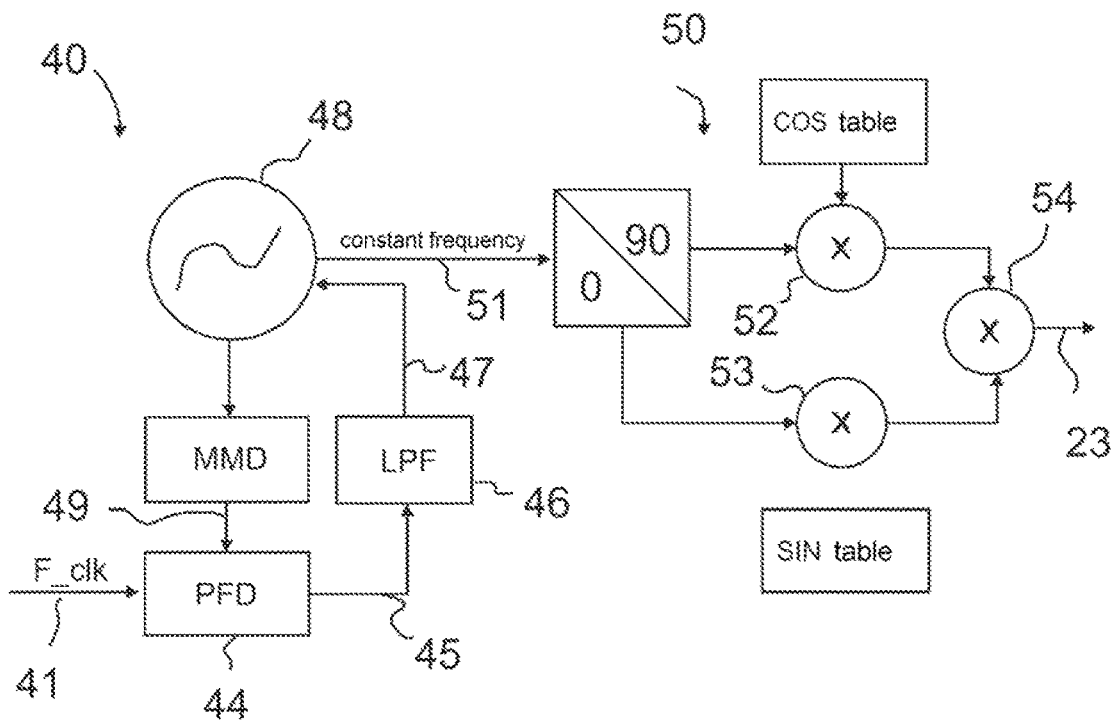

FIGS. 4A and 4B show two different implementations of transmitter circuits in order to obtain the sinusoidally frequency-modulated continuous-wave radar signal 23.

In the example implementation outlined in FIG. 4A, the transmitter 22 has a phase-locked loop 40 which has a carrier frequency signal (or a fraction thereof) which is modulated with the modulation frequency as an input signal 43 and is configured, on the basis thereof, to output the frequency-modulated continuous-wave radar signal 23 as a transmission signal. For this purpose, digital samples 41 corresponding to the carrier frequency (or the fraction thereof) can be combined with samples which are stored in a table 42 and correspond to the sinusoidal modulation frequency (or the fraction thereof) in order to obtain the output or frequency signal 43 of the phase-locked loop 40. A phase frequency detector (PFD) 44 compares the frequency and phase of the reference signal 43 with the frequency and phase of a feedback signal 49, that is to say of the frequency-modulated continuous-wave radar signal 23 (or the fraction thereof) generated by the PLL 40, for example. An output signal 45 from the PFD 44 is smoothed using a loop filter (for example a low-pass filter) 46. An output signal from the loop filter 46 is then used as a control signal 47 for a VCO 48 which outputs the frequency-modulated continuous-wave radar signal 23. A feedback path comprises an optional frequency divider in order to provide the feedback signal 49 based on the frequency-modulated continuous-wave radar signal 23.

In the example implementation outlined in FIG. 4B, the phase-locked loop 40 provides an unmodulated real carrier frequency signal 51 at a constant frequency at the output of the VCO 48. The sinusoidal frequency modulation of the carrier frequency signal 51 is then carried out using an IQ modulator 50 which divides the real carrier frequency signal 51 into a first quadrature component (I) and into a second quadrature component (Q) which has been phase-shifted through 90° in comparison. The two quadrature components are each combined, via mixers 52, 53, with sinusoidal and cosinusoidal modulation signal components which correspond to the sinusoidal modulation frequency. The resulting quadrature components are then combined at 54 to form the sinusoidally frequency-modulated continuous-wave radar signal 23. In the example implementation outlined in FIG. 4B, the phase-locked loop 40 therefore generates an RF signal 51 at the (unmodulated) carrier frequency. The IQ modulator 50 is configured to modulate the RF signal 51 with the modulation frequency and to generate the frequency-modulated continuous-wave wave radar signal 23 on the basis thereof.

Figure 5A:
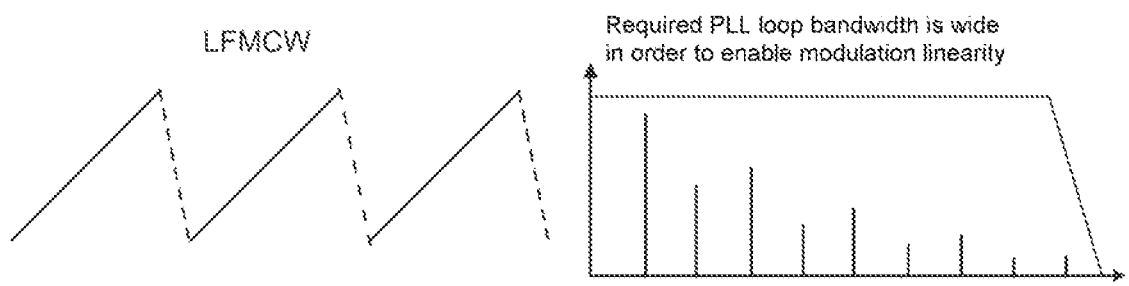
FIGS. 5A and 5B show different requirements imposed on loop filters.
Figure 5B:
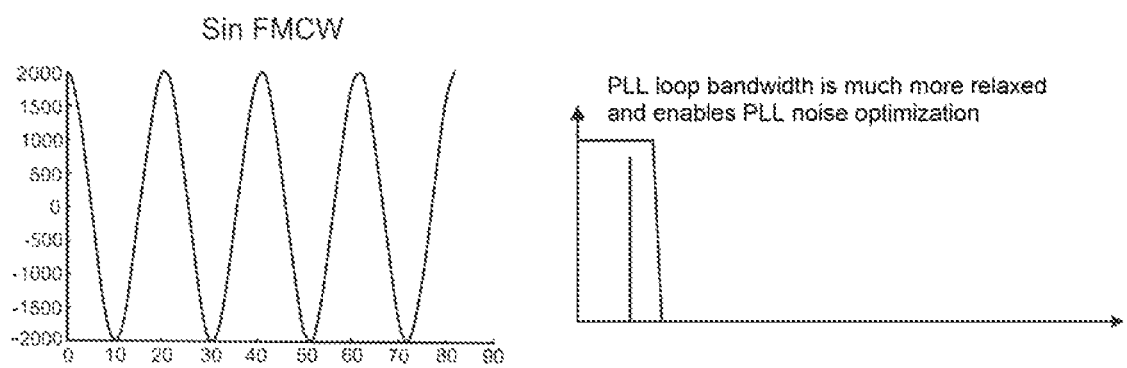

The sinusoidal frequency modulation can provide some additional advantages in comparison with linear frequency modulation since the PLL 40 itself only has to generate an unmodulated carrier frequency and can be optimized for the best noise behavior. This is illustrated in FIGS. 5A and 5B. Whereas a bandwidth of the loop filter 46 must be selected to be large for the linear frequency modulation (FIG. 5A), the bandwidth of the loop filter 46 can be selected to be relatively narrow for the sinusoidal frequency modulation (FIG. 5B). The same look-up table (LUT) containing simple mathematical equations for converting from one to the other can be used in each case for the SIN-modulated and COS-modulated signals.

In the receiver 24, the sinusoidally frequency-modulated continuous-wave radar signal can be down-converted using the same PLL 40 and the same modulation scheme, but with a delay which is proportional to the distance from the reflection target 26. As shown in FIG. 3, the baseband frequency of the target reflection is no longer constant as in conventional linear FMCW, but rather varies from a minimum to a maximum (see baseband signal 27 in FIG. 3). A conventional Fourier transform (so-called range FFT) is therefore no longer readily possible for determining the distance.

In order to create a range map of the target reflections, the present disclosure proposes a "correlation" approach using pattern signals which correspond to different distances. For this purpose, the baseband signal 27 can be multiplied, at the receiving end downstream of an ADC, by a plurality of sinusoidally modulated pattern signals 29 each representing different delays (distances). The plurality of pattern signals 29 may be represented, for example, in a 2-dimensional matrix in which a first dimension corresponds to the number N of baseband samples for each pattern signal and a second dimension corresponds to a number of M distances (or delay values) to be tested. A significant DC level which is proportional to the strength of the received signal can be generated using a mean value of the correlation response using a comparison of the baseband signal 27 and the sinusoidally modulated pattern signals 29 for a particular delay value. The correlating device 28 may therefore be configured to determine a correlation result for a pattern signal 29 correlated with the baseband signal 27 and to determine a target object at the predetermined distance corresponding to the pattern signal based on the correlation result.

The proposed principle is mathematically described below.

The sinusoidal modulation frequency can be represented as follows.

$$FM\_sin\_TX = BW\_slope \cdot \cos(2\pi \cdot F\_mod \cdot t + start\_phase) \quad (1)$$

In this case, BW_slope signifies an amplitude of the modulation frequency (frequency swing), F_mod signifies a rate of change of the modulation frequency (slope) and start_phase signifies an initial phase of the modulation frequency.

This results in the quadrature components (sin/cos) of the sinusoidally frequency-modulated continuous-wave radar signal 23 as follows:

$$TX\_RF\_sin = \sin(2\pi \cdot (F\_rf + FM\_sin\_TX) \cdot t)$$

$$TX\_RF\_cos = \cos(2\pi \cdot (F\_rf + FM\_sin\_TX) \cdot t) \quad (2)$$

In this case, F_rf signifies an (unmodulated) carrier frequency of the frequency-modulated continuous-wave radar signal.

The quadrature components (sin/cos) of the reflection signal 25 (assuming an individual reflective object 26) can be represented as follows:

$$LO\_rx\_sin = \sin(2\pi \cdot (F\_rf + FM\_sin\_TX) \cdot (t-\tau))$$

$$LO\_rx\_cos = \cos(2\pi \cdot (F\_rf + FM\_sin\_TX) \cdot (t-\tau)) \quad (3)$$

In this case, $\tau$ signifies a delay time corresponding to the distance of the target object 26.

The quadrature components (sin/cos) of the baseband signal 27 are obtained by mixing the transmission signal 23 with the reflection signal 25:

$$IF\_sin = TX\_RF\_sin \cdot LO\_rx\_cos - TX\_RF\_cos \cdot LO\_rx\_sin \quad (4A)$$

$$IF\_cos = TX\_RF\_cos \cdot LO\_rx\_cos + TX\_RF\_sin \cdot LO\_rx\_sin \quad (4B)$$

The quadrature components (sin/cos) of the pattern signal 29 for a predetermined distance to be tested can be represented as follows:

$$TX\_corr\_sin = \sin(-2\pi \cdot FM\_sin\_TX \cdot \tau_2)$$

$$TX\_corr\_cos = \cos(-2\pi \cdot FM\_sin\_TX \cdot \tau_2) \quad (5)$$

In this case, $\tau_2$ signifies a delay time corresponding to a distance to be tested. It will be clear to a person skilled in the art that $\tau_2$ may assume a plurality of predetermined values between useful starting and end values. This is schematically shown in FIG. 10.

Figure 10:
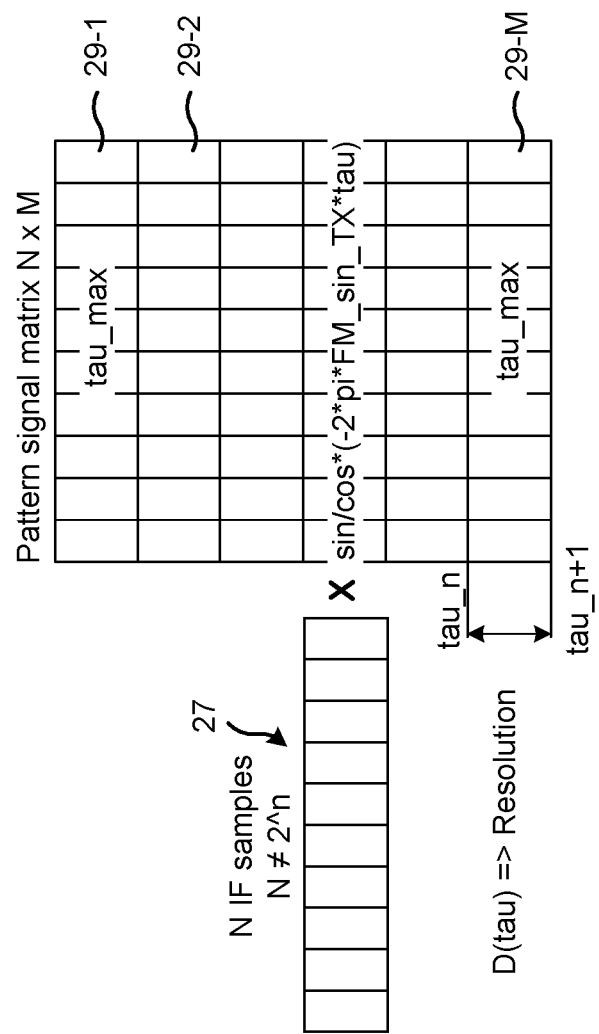
FIG. 10 shows a schematic illustration of a baseband signal vector and a pattern signal matrix.

FIG. 10 shows N samples of a chirp of the baseband signal 27. In this case, it is highlighted again that $N \neq 2^n$, which can result in a higher degree of signal processing flexibility in comparison with conventional FFT-based approaches. The N×1 baseband signal vector is correlated with rows of an N×M pattern signal matrix, where M signifies a number of delay times $\tau_2$ corresponding to distances to be tested. Each row of the pattern signal matrix therefore corresponds to a pattern signal 29-m (m=1, . . . , M) with a different predetermined delay time $\tau_{2,m}$ (m=1, . . . , M) in a range between $\tau_{2,min}$ and $\tau_{2,max}$. In this case, the pattern signals 29-m can be selected according to a desired distance or delay time range [$\tau_{2,min}$; $\tau_{2,max}$] (to be tested) and/or a desired distance or delay time resolution. The difference between two adjacent delay times $\Delta\tau_2 = \tau_{2,m+1} - \tau_{2,m}$ (m=1, . . . , M−1) corresponds to a distance resolution. The smaller $\Delta\tau_2$, the greater the distance resolution. It will be clear to a person skilled in the art that $\Delta\tau_2$ between each pair of adjacent delay times may be identical (equidistant distance or delay time grid) or different (non-equidistant distance or delay time grid).

Figure 11:
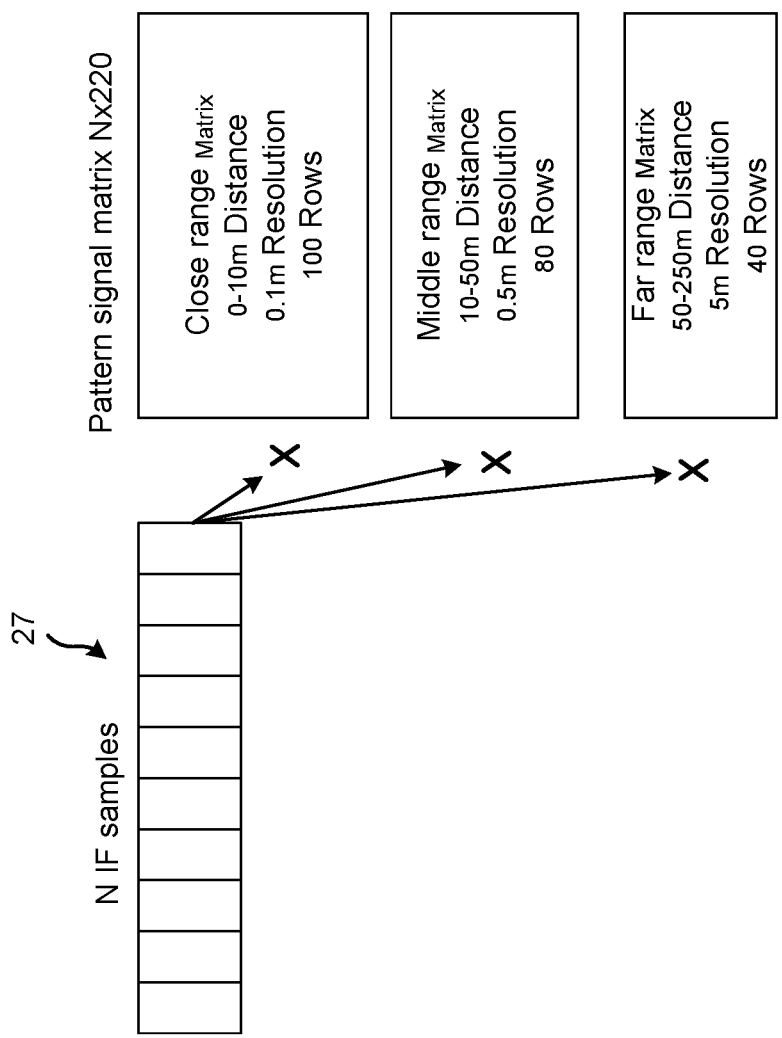
FIG. 11 shows a schematic illustration of a pattern signal matrix with different distance resolutions.

In this respect, FIG. 11 shows an example of an N×220 pattern signal matrix (M=220) in which the upper 100 rows or pattern signals correspond to a close range of a distance of 0 m to 10 m and a distance resolution of 0.1 m. The middle 80 rows or pattern signals of the pattern signal matrix correspond to a middle distance range of 10-50 m and a distance resolution of 0.5 m. The lower 40 rows or pattern signals of the N×220 pattern signal matrix correspond to a far range of 50-250 m and a distance resolution of 5 m. The three submatrices of the N×220 pattern signal matrix may also be understood as separate pattern signal matrices. A plurality of pattern signal matrices can therefore be used in a parallel manner. In this case, "parallel" means for a chirp. It is therefore possible to combine different distance resolutions with an N×1 baseband signal vector of a chirp.

The correlating device 28 may therefore be configured to use different pattern signal (sub)matrices to vary the distance range and/or a distance resolution formed by the respective pattern signals 29. For example, the correlating device 28 may be configured to correlate the baseband signal 27 for a first distance range with pattern signals 29 corresponding to a first distance or delay time resolution and for a second distance range with pattern signals corresponding to a second distance or delay time resolution. For example, the first distance range may be a close range and the second distance range may be a far range and the first distance or delay time resolution may be higher than the second distance or delay time resolution.

Figure 12:
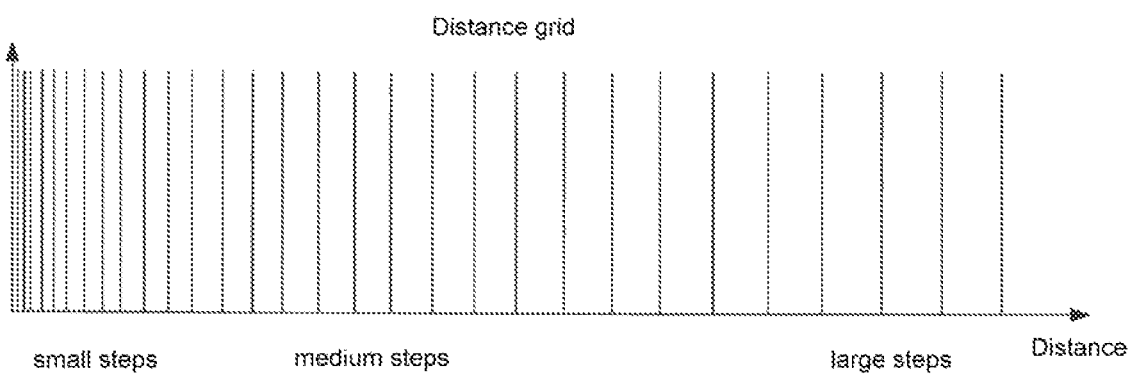
FIG. 12 shows a non-equidistant distance or delay time grid of a pattern signal matrix.

The (distance or delay time) grid corresponding to the pattern signals of a pattern signal matrix may not be equidistant in this case. For example, the (distance or delay time) grid of the N×220 pattern signal matrix in FIG. 11 is not equidistant overall. However, the respective (distance or delay time) grids of the three submatrices in FIG. 11 are each equidistant (0.1 m resolution, 0.5 m resolution and 5 m resolution). A further example of a semi-logarithmic: and therefore non-equidistant (distance or delay time) grid is shown in FIG. 12. In this case too, a distance resolution is higher in a close range than in the far range. Spacings between adjacent predetermined distances or delay times of the pattern signal matrix increase continuously with respect to increasing distances.

Figure 13A:
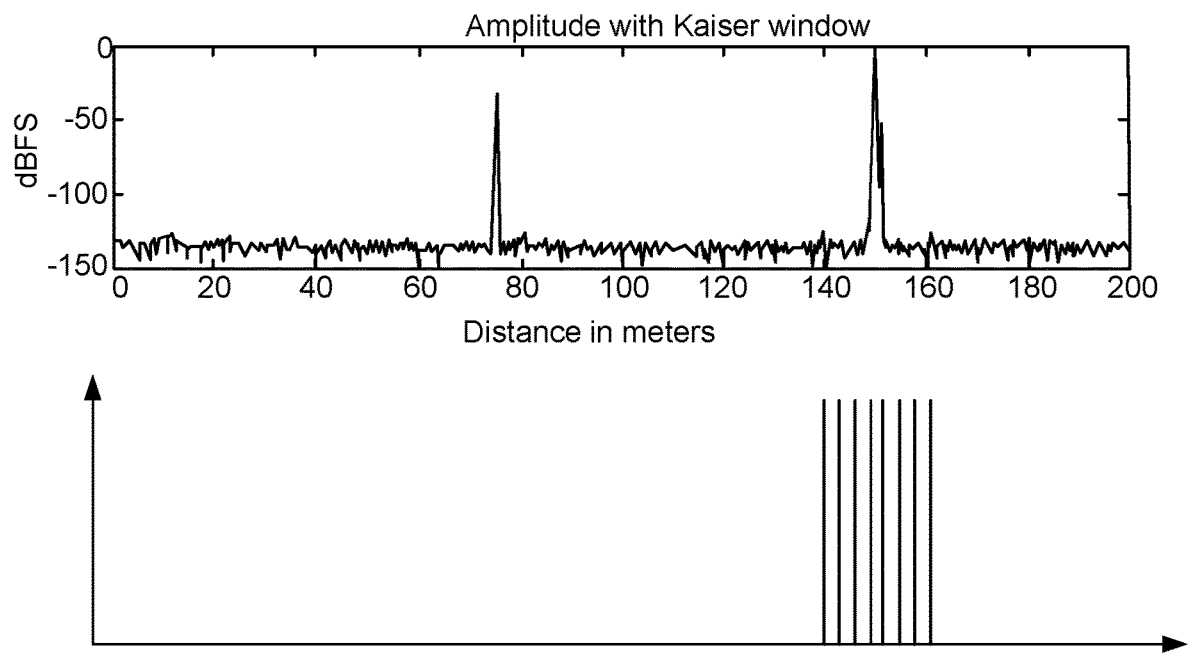
FIGS. 13A and 13B show schematic illustrations of a zoom-in functionality.

A further advantage of example implementations is the so-called zoom-in functionality or magnification functionality which is described based on FIGS. 13A, B.

FIG. 13A (at the top) shows, by way of example, a result of a first distance measurement using a first pattern signal matrix corresponding to a distance range of 0-200 m. In this case, the first distance measurement may be, for example, a rough distance measurement with a relatively low distance resolution. Two detected target objects at a distance of 75 m and 150 m can be seen, for example. If the target object at a distance of 150 m is now of particular interest, for example, a second distance measurement can be carried out, for example, by correlating the baseband signal 27 with a second pattern signal matrix corresponding to a distance range of 140-160 m. The distance resolution of the second pattern signal matrix may be higher than that of the first pattern signal matrix in order to obtain a more accurate distance measurement in the distance range of interest. It is therefore possible to carry out an additional multiplication of the baseband signal 27 (N×1 baseband signal vector) by a further pattern signal matrix around a detected object in order to obtain more information (better resolution). This multiplication/correlation can be carried out in the background in parallel with current or new measurements.

The correlating device 28 may therefore be configured to correlate the baseband signal 27 of a chirp interval with pattern signals 29 corresponding to a first distance or delay time grid in order to obtain a first estimation of target objects and, after the first estimation of target objects, to adapt a (distance or delay time) grid of the pattern signals 29 to target objects or their distances which were determined in the first estimation. The correlating device 28 may be configured, in particular, to compress the (distance or delay time) grid in a predefined distance or delay time range around a determined target object in comparison with the first estimation.

Figure 13B:
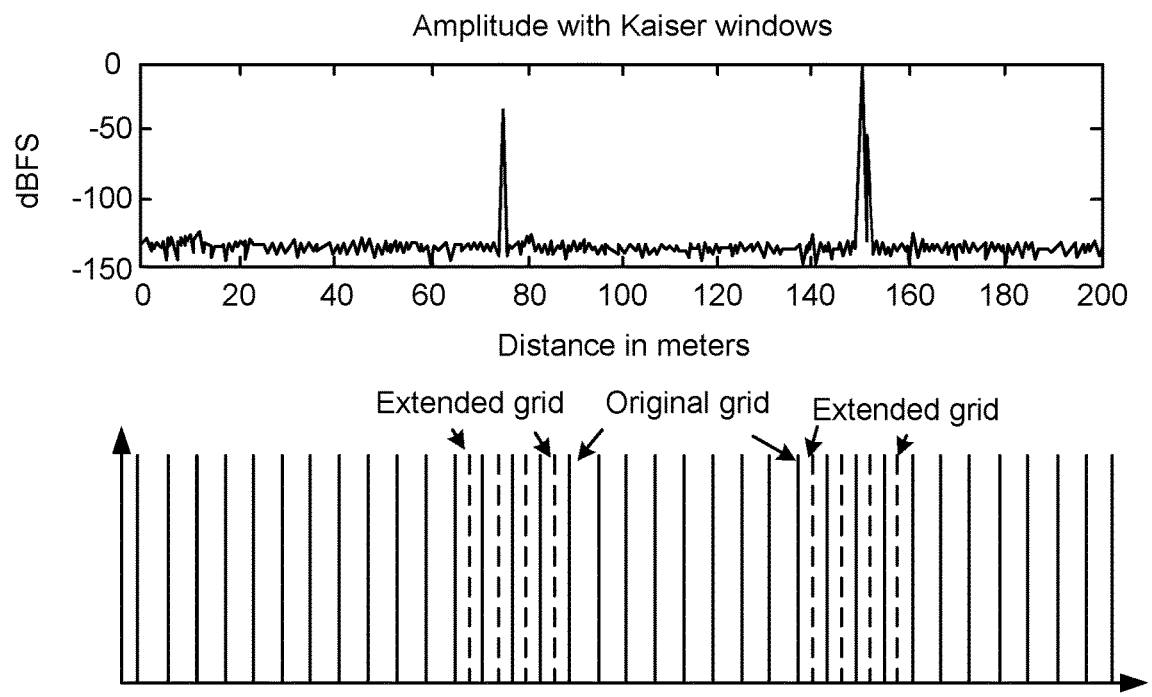

For this purpose, FIG. 13B schematically shows a further example implementation in which the first pattern signal matrix is compressed in the distance range of the target objects determined in the first (rough) distance measurement. Therefore, at least one additional pattern signal corresponding to a distance or delay time in between can be inserted between two adjacent pattern signals of the first pattern signal matrix. A pattern signal matrix compressed in this manner can now be used for the same chirp and/or for directly or subsequently following chirps. After testing the first chirp results, it is therefore possible to extend the pattern signal matrix with additional pattern signal components having delay times (distances) in the ranges of interest in order to obtain more information relating to critical targets. No changes to the chirp parameters are required for this purpose. Ongoing measurements can be continued.

A correlation result from the device 28 can be represented as follows:

$$\text{mean\_sin}=\text{mean}(TX\_\text{corr\_sin}*IF\_\text{cos}-TX\_\text{corr\_cos}*IF\_\text{sin}) \qquad (6A)$$

$$\text{mean\_cos}=\text{mean}(TX\_\text{corr\_sin}*IF\_\text{sin}+TX\_\text{corr\_cos}*IF\_\text{cos}) \qquad (6B)$$

Figure 6:
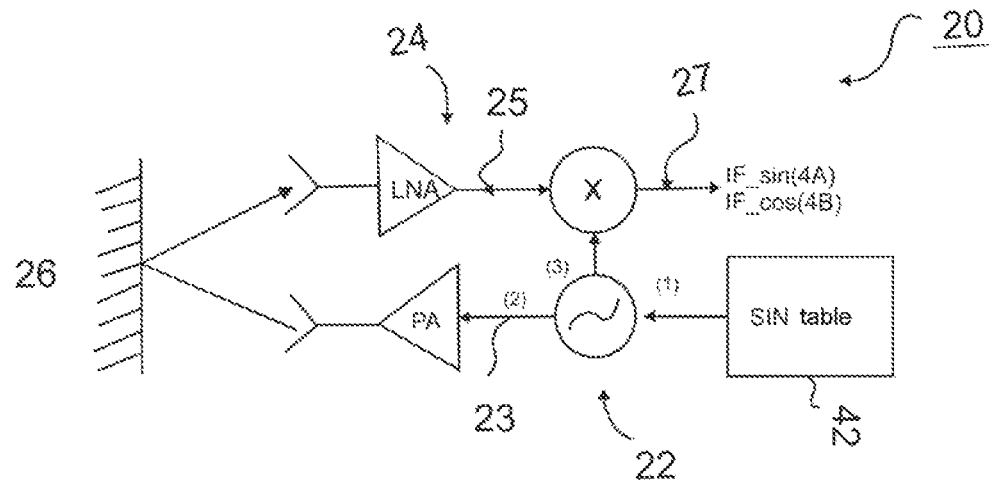
FIG. 6 shows a block diagram of a radar apparatus according to one example implementation of the present disclosure.

FIG. 6 shows a simplified illustration of the radar apparatus 20 having a transmitter 22 and a receiver 24. The sinusoidal modulation frequency FM_sin_TX is used to modulate the LO 47 and to thus obtain the sinusoidally frequency-modulated continuous-wave radar signal (transmission signal) 23 which is amplified using a transmission amplifier is then emitted using an antenna. The transmission signal 23 is then reflected at an object 26, received by a reception antenna and amplified using an LNA. The reflection signal 25 obtained in this manner is mixed with the transmission signal 23 in order to obtain the baseband signal 27. The quadrature components of the baseband signal 27 (IF_sin, IF_cos) are used as an input for the correlation device 28 for correlating the baseband signal 27 with the pattern signals 29 for different delays $\tau_2$.

Figure 7A:
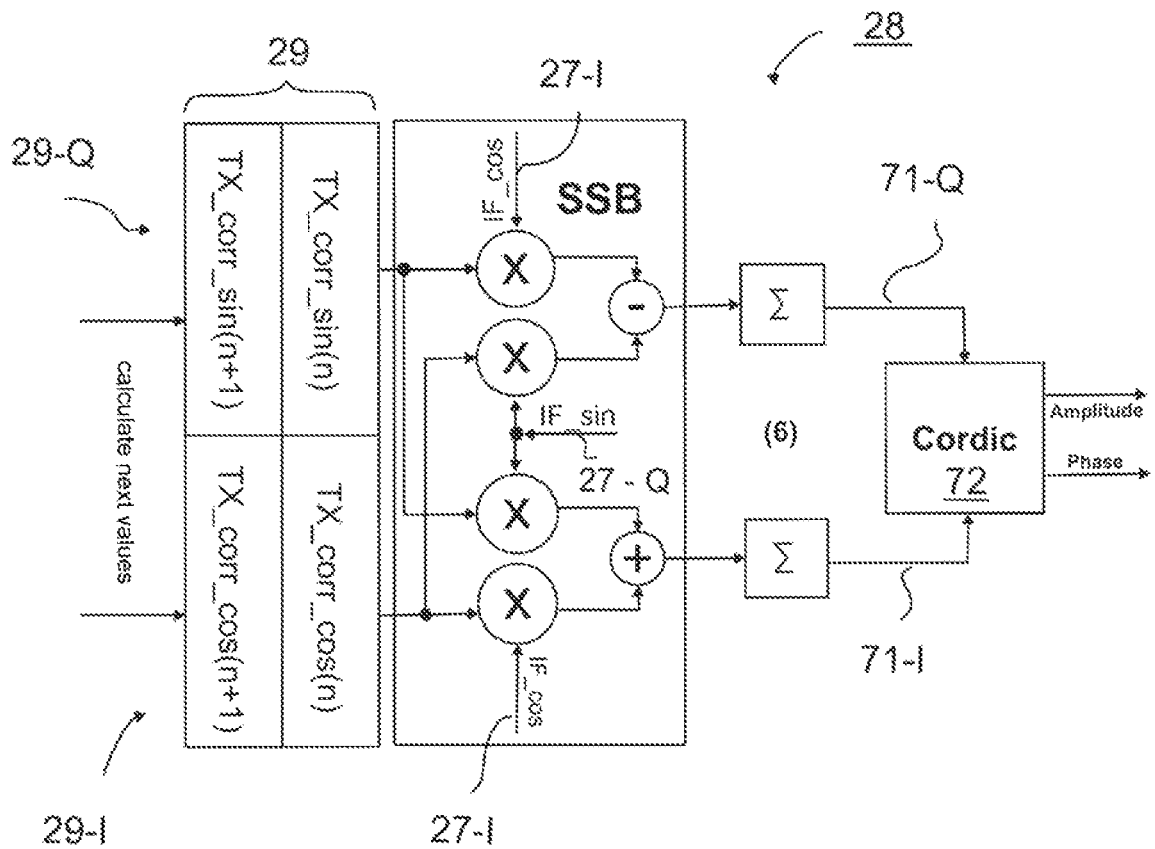
FIGS. 7A-7C show different implementations of a correlation device according to example implementations of the present disclosure.

The correlation device 28 may be technically implemented in different ways. FIG. 7A schematically shows a first possibility for implementing the correlation device 28 in the digital baseband.

The baseband signal 27 has samples of a first quadrature component 27-Q (IF_sin) and samples of a second quadrature component 27-I (IF_cos). Each pattern signal 29 has samples of a first quadrature component 29-Q (TX_corr_sin) and samples of a second quadrature component 29-I (TX_corr_cos). The correlation device 28 is configured to determine a first quadrature component 71-Q (mean_sin) of a correlation signal and a second quadrature component 71-I (mean_cos) of the correlation signal based on a combination of the samples of the quadrature components of the baseband signal 27 and of the pattern signal 29. In particular, the correlation device 28 may be configured to determine the first quadrature component of the correlation signal 71-Q based on a difference between a first product of the first quadrature component of the pattern signal 29-Q and the second quadrature component of the baseband signal 27-I and a second product of the second quadrature component of the pattern signal 29-I and the first quadrature component of the baseband signal 27-Q and to determine the second quadrature component of the correlation signal 71-I based on a sum of a first product of the first quadrature component of the pattern signal 29-Q and the first quadrature component of the baseband signal 27-Q and a second product of the second quadrature component of the pattern signal 27-I and the second quadrature component of the baseband signal 27-I. Samples of the respective quadrature components of the correlation signal can then also be averaged, for example over a chirp. This corresponds to equations 6A, 6B mentioned above:

mean_sin=mean(TX_corr_sin*IF_cos−
TX_corr_cos*IF_sin)

mean_cos=mean(TX_corr_sin*IF_sin+
TX_corr_cos*IF_cos)

The correlation device 28 in FIG. 7A is configured to determine the amplitude and phase of the correlation signal based on the first and second quadrature components of the signal 71-Q, 71-I, for example using a CORDIC algorithm (Coordinate Rotation Digital Computer) 72. If the amplitude of a correlation result is sufficiently high, it is possible to assume an object (target) at the respective distance (corresponding to $\tau_2$). If a range map has been created therewith, speed information relating to the target objects can be determined on the basis thereof, for example the speed information can be determined based on phase information for the determined distance bins. More precisely, Doppler frequencies and therefore relative speeds of the target objects can be inferred based on phase differences of the matching correlation results between different chirps.

In the example implementation outlined in FIG. 7A, samples of the first quadrature component of the baseband signal 27-Q (IF_sin) and samples of the second quadrature component of the baseband signal 27-I (IF_cos) of one or more chirps may be stored in a memory (RAM) and used to sequentially calculate a correlation matrix containing all pattern signals for different delay values $\tau_2$. The pattern signals 29-Q, 29-I may be calculated online (that is to say during operation of the radar apparatus 20) for each individual delay value $\tau_2$ and used to calculate the correlation matrix. The calculated correlation signals 71-Q, 71-I may be stored in the RAM in order to be used as an analog of the range FFT in the conventional linear FMCW approach for the further signal processing. An advantage of the approach outlined in FIG. 7A is simple hardware, but it requires a large number of online calculations (CPU load).

Figure 7B:
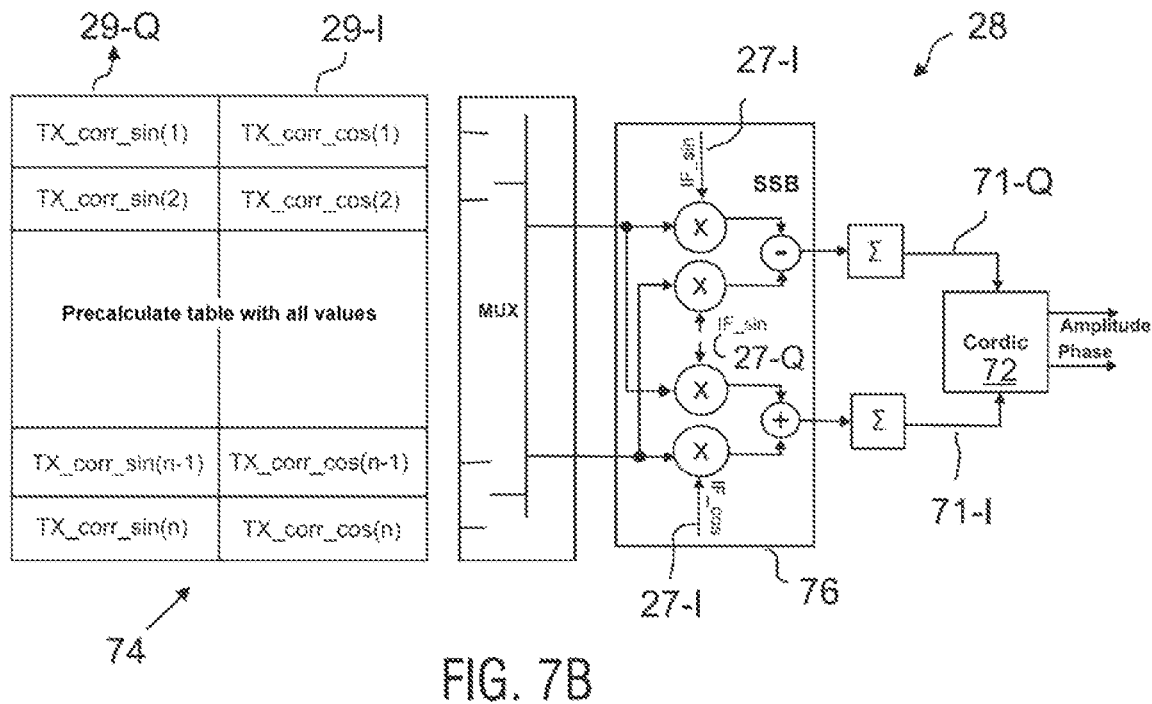

FIG. 7B shows a further possibility for a correlation device 28 which has an increased hardware outlay in comparison with FIG. 7A but requires fewer online calculations. In the approach outlined in FIG. 7B, all pattern signals 29-Q, 29-I can be calculated in advance for all delay values $\tau_2$ and stored in the RAM before a chirp sequence is started. The radar apparatus 20 therefore here comprises a memory 74 for previously determined samples of the pattern signals for each of the different predefined distances. This results in fewer online calculations during operation, but more RAM is needed to store the pattern signals 29-Q, 29-I.

Figure 7C:
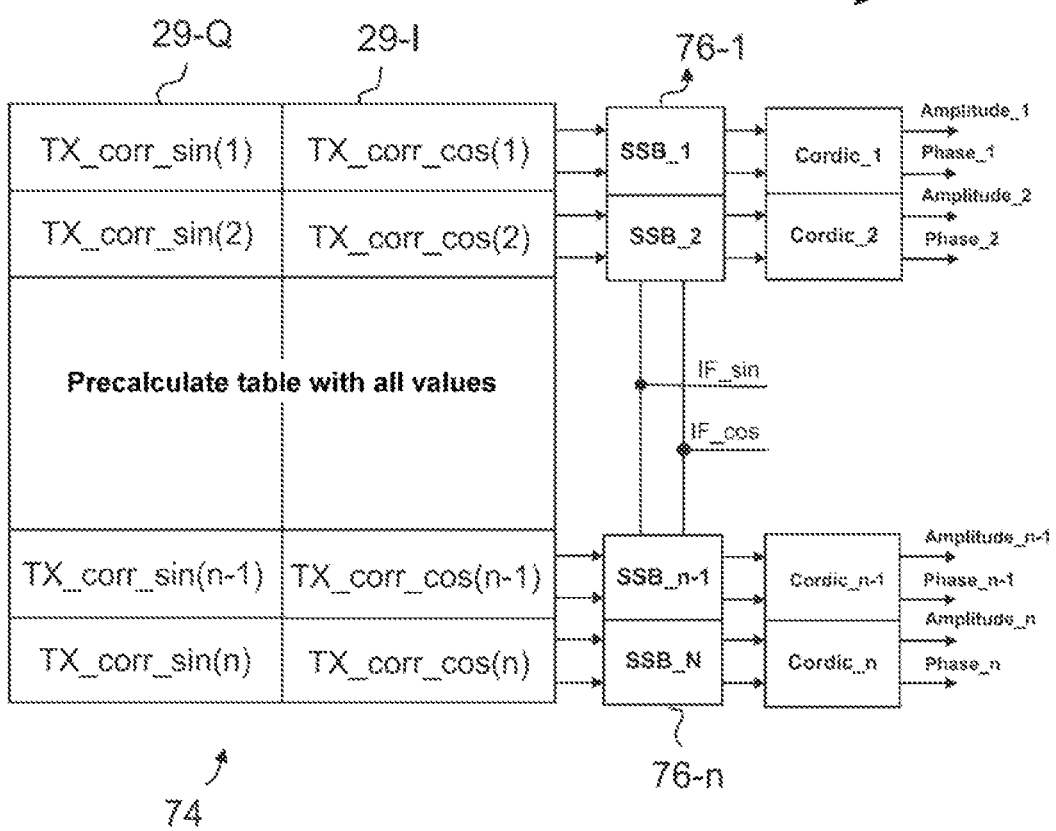

An approach with an even shorter calculation time is illustrated in FIG. 7C. In this case, all correlation responses for all possible delay values $\tau_2$ can be calculated in a parallel manner at the same time using a number of correlation mixers (single-sideband mixers) 76. The correlation device 28 in FIG. 7C is therefore configured to calculate the correlation signals 71 (or amplitude and phase) for a plurality of pattern signals 28 for different predefined distances $\tau_2$ in a parallel manner. This results in a shorter calculation time and a better option for hardware accelerations.

Figure 8:
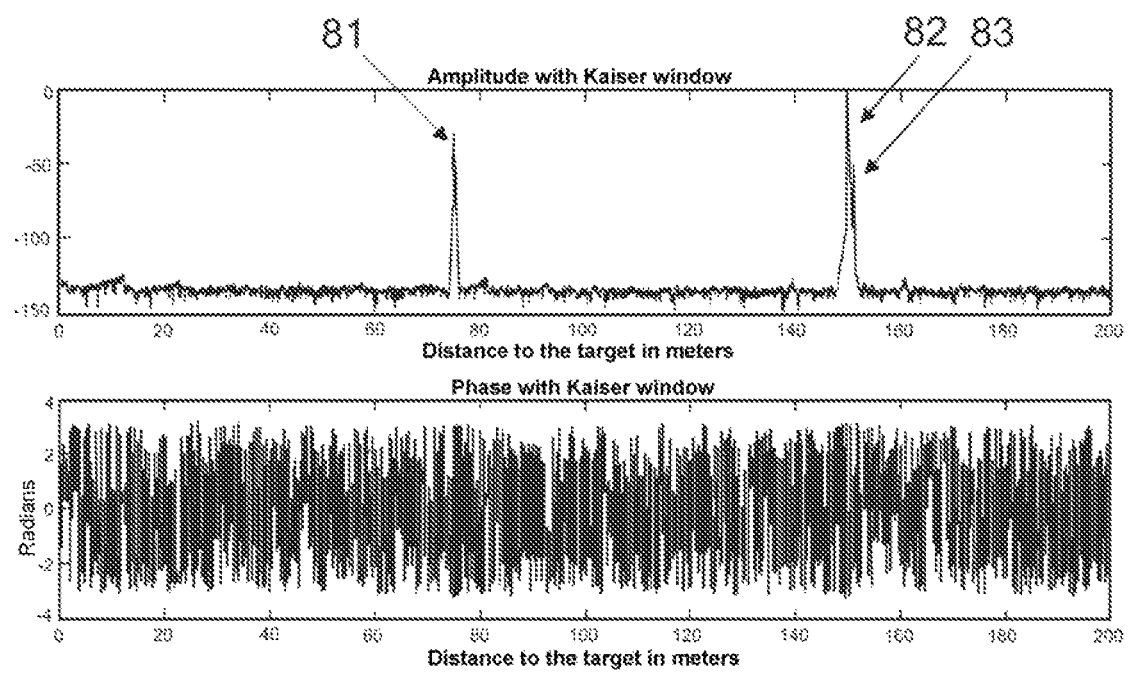
FIG. 8 shows correlation results with three target objects.

An example shown in FIG. 8 shows a simulation result with three target reflections 81, 82, 83 at distances of 75 m, 150 m and 151 m and levels (amplitudes) of −30 dBFS, 0 dBFS and −50 dBFS (dBFS=decibels relative to full scale). A chirp (down or up) with a duration of 10.24 µs, 512 baseband signal samples and 2048 delay bins was simulated. It is therefore possible to separate very close targets even in the case of short ramps (10.24 µs) with a small number of samples (512), which is difficult using the conventional linear FMCW radar approach. In the proposed correlation approach, the distance resolution depends on the number of correlation bins (TX delay pattern) and does not depend on the ramp duration and the number of baseband signal samples.

Figure 9:
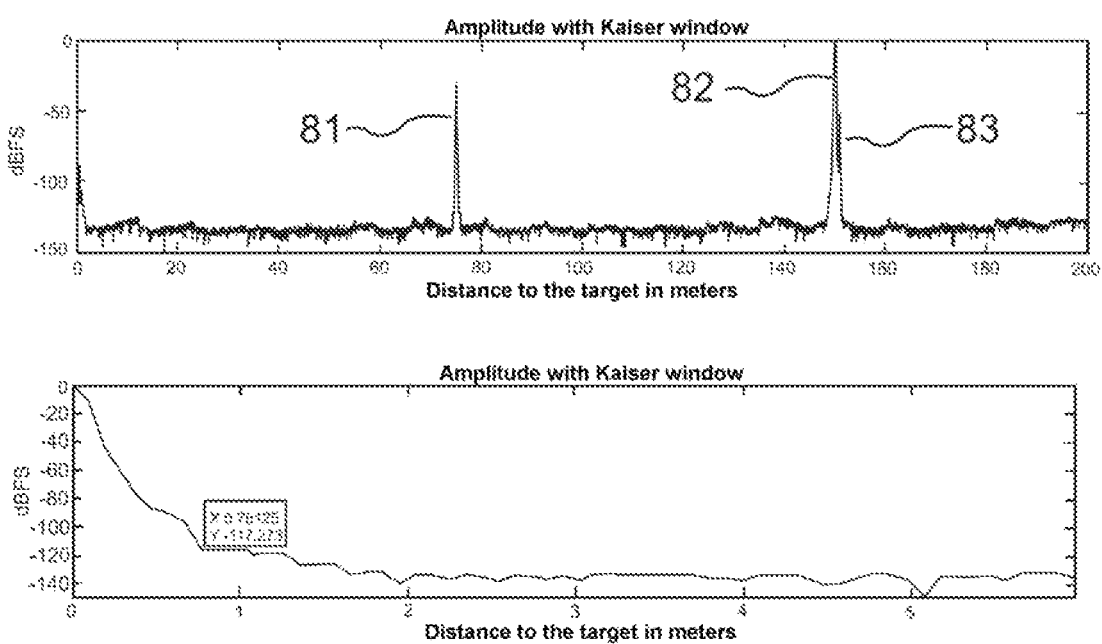
FIG. 9 shows correlation results with three target objects and strong CW interference signals.

A further advantage of the proposed solution is the independence of CW signals (interference signals) in the RX signal path which come, for example, from the power supply or other components such as the ADC. FIG. 9 shows simulation results of the proposed method with three strong CW signals having amplitudes of 0 dBFS and frequencies of 100 kHz, 1 MHz and 10 MHz which were added to the same target reflections as in FIGS. 10 and 11 in the previous simulation example. As can be seen in FIG. 9, the CW interference components added to the RX signal path after the correlation procedure are visible only in bin 0, which corresponds to the zero spacing with respect to the potential target. However, the target spacing of zero does not have any practical significance and can be easily ignored. On account of calculation errors, some correlation drops around bin 0 are visible in FIG. 9 (at the bottom), but the drops are already low enough at a target distance of less than 1 meter. In the conventional linear FMCW method, all three CW interference signals are visible as three strong spurious targets with high levels (0 dBFS).

The correlation approach presented here also makes it possible to very easily calculate the target speeds (Doppler frequencies). The correlator outputs of equations 6A and 6B represent the SIN and COS components of the output signal. The signal amplitude and phase can be calculated from the SIN and COS components ("Cordic" in FIG. 7). The Doppler frequency and the target speed can be calculated based on the phase information relating to the individual correlation bins associated with the same correlation interval for a plurality of successive ramps or chirps. After calculating the phase variation for all correlation bins, it is possible to create a range-Doppler map, as is used in conventional radar applications with linear FMCW modulation methods.

The proposed solutions can be used to detect targets in radar applications. The proposed solutions may have the following advantages:

There is no need for any fly-back and transient recovery intervals between the ramps. Therefore, 100% of the time can be used for measurements (energy saving, faster measurements). There are no sharp frequency edges and a simplified analog PLL design up to a constant carrier frequency is possible. The system is not susceptible to CW interference (simplified requirements imposed on the DC-DC power supply, filter elements and ADC SFDR). The range resolution does not depend on the ramp duration (number of baseband sampling operations). Short ramps with a high resolution are possible. CMOS technologies enable a high reduction rate for digital components, but virtually no reduction potential for analog units such as PLLs or power supply filtering, with the result that the simplification of analog units and the transfer of the complexity to the digital domain can result in considerable improvements on the chip side or chip size (and in the costs).

The invention claimed is:

1. A radar apparatus, comprising:
a transmitter configured to transmit a frequency-modulated continuous-wave radar signal, wherein the transmitter is configured to generate the continuous-wave radar signal with a sinusoidally varying modulation frequency;
a receiver configured to receive a reflection signal of the frequency-modulated continuous-wave radar signal, which is reflected by at least one object, and configured to mix the reflection signal with the frequency-modulated continuous-wave radar signal in order to obtain a downmixed reception signal; and
a correlating device comprising a processing circuit, the correlating device configured to correlate the downmixed reception signal with a pattern signal that is based on the sinusoidally varying modulation frequency and a predetermined distance.

2. The radar apparatus as claimed in claim 1, wherein the transmitter is configured to generate the continuous-wave radar signal with a continuously sinusoidally varying modulation frequency.

3. The radar apparatus as claimed in claim 1, wherein the pattern signal is based on the sinusoidally varying modulation frequency and a signal propagation time corresponding to the predetermined distance.

4. The radar apparatus as claimed in claim 1, wherein the correlating device is configured to determine a correlation result for the pattern signal correlated with the downmixed reception signal and to determine a target object at the predetermined distance based on the correlation result.

5. The radar apparatus as claimed in claim 4, wherein the frequency-modulated continuous-wave radar signal is subdivided into successive chirp intervals, and wherein the correlating device is configured to determine distance bins corresponding to target objects for each successive chirp interval.

6. The radar apparatus as claimed in claim 5, wherein the correlating device is configured to subdivide the frequency-modulated continuous-wave radar signal into continuously successive chirp intervals.

7. The radar apparatus as claimed in claim 5, wherein the correlating device is configured to determine speed information relating to the target objects, wherein the correlating device is configured to determine the speed information based on phase information for the determined distance bins.

8. The radar apparatus as claimed in claim 1, wherein the frequency-modulated continuous-wave radar signal is subdivided into successive chirp intervals, and the downmixed reception signal and the pattern signal for a chirp interval each have a number of samples that differs from a power of 2.

9. The radar apparatus as claimed in claim 1, wherein the transmitter has a phase-locked loop which has a carrier frequency signal as an input signal, the carrier frequency signal being modulated with the sinusoidally varying modulation frequency, wherein the phase-locked loop is configured, based on the carrier frequency signal, to output the frequency-modulated continuous-wave radar signal as a transmission signal.

10. The radar apparatus as claimed in claim 1, wherein the transmitter comprises:
a phase-locked loop which has a carrier frequency signal as an input signal and is configured, based on the carrier frequency signal, to output a radio frequency signal at a carrier frequency of the carrier frequency signal; and
an IQ modulator configured to modulate the RF signal with the sinusoidally varying modulation frequency and to generate the frequency-modulated continuous-wave radar signal on the basis thereof.

11. The radar apparatus as claimed in claim 1, wherein a first plurality of pattern signals corresponds to a distance range from a starting distance to an end distance, and wherein the correlating device is configured to use a second plurality of pattern signals differing from the first plurality of pattern signals to vary at least one of the distance range or a distance resolution formed by the first plurality of pattern signals.

12. The radar apparatus as claimed in claim 1, wherein the correlating device is configured to correlate the downmixed reception signal for a first distance range with first pattern signals corresponding to a first distance resolution and correlate the downmixed reception signal for a second distance range with second pattern signals corresponding to a second distance resolution.

13. The radar apparatus as claimed in claim 12, wherein the first distance range is a close range and the second distance range is a far range, and wherein the first distance resolution is higher than the second distance resolution.

14. The radar apparatus as claimed in claim 12, wherein a grid corresponding to the first pattern signals and the second pattern signals is not equidistant.

15. The radar apparatus as claimed in claim 1, wherein the frequency-modulated continuous-wave radar signal is subdivided into successive chirp intervals, and wherein the correlating device is configured to correlate the downmixed reception signal of a chirp interval with pattern signals corresponding to a first distance grid in order to obtain a first estimation of target objects and, after the first estimation of target objects, to adapt a grid of pattern signals to the target objects which were determined during the first estimation.

16. The radar apparatus as claimed in claim 15, wherein the correlating device is configured to compress the grid of the pattern signals in a predefined distance range around a determined target object in comparison with the first estimation.

17. The radar apparatus as claimed in claim 15, wherein the correlating device is configured to correlate the downmixed reception signal of the chirp interval or a subsequent chirp interval in a distance range around a target object determined in the first estimation with further pattern signals corresponding to a second distance grid which corresponds to a finer distance resolution than the first distance grid.

18. The radar apparatus as claimed in claim 1, wherein the downmixed reception signal has a first quadrature component and a second quadrature component, wherein the pattern signal has a first quadrature component and a second quadrature component, and wherein the correlating device is configured to determine a first quadrature component of a correlation signal and a second quadrature component of the correlation signal based on a combination of the first quadrature component of the downmixed reception signal, the second quadrature component of the downmixed reception signal, the first quadrature component of the pattern signal, and the second quadrature component of the pattern signal.

19. The radar apparatus as claimed in claim 18, wherein the correlating device is configured to determine an amplitude and a phase of the correlation signal based on the first quadrature component of the correlation signal and the second quadrature component of the correlation signal.

20. The radar apparatus as claimed in claim 18, wherein the correlating device is configured to calculate the correlation signals for a plurality of pattern signals for different predefined distances in a parallel manner.

21. The radar apparatus as claimed in claim 1, wherein the correlating device is configured to multiply samples of the downmixed reception signal by samples of a plurality of pattern signals for different predefined distances in order to obtain respective correlation signals.

22. The radar apparatus as claimed in claim 21, wherein the correlating device is configured to calculate the samples of the plurality of pattern signals for the different predefined distances during operation of the radar apparatus for each of the different predefined distances.

23. The radar apparatus as claimed in claim 21, further comprising: a memory for previously determined samples of the pattern signals for the different predefined distances for each of the different predefined distances.

24. The radar apparatus as claimed in claim 1, wherein the sinusoidally varying modulation frequency is based on the following representation:

$$FM\_sin\_TX = BW\_slope * \cos(2*\pi*F\_mod*t + start\_phase),$$

where BW_slope signifies an amplitude of the sinusoidally varying modulation frequency, F_mod signifies a rate of change of the sinusoidally varying modulation frequency, and start_phase signifies an initial phase of the sinusoidally varying modulation frequency.

25. The radar apparatus as claimed in claim 24, wherein the frequency-modulated continuous-wave radar signal is based on the following representation:

$$TX\_RF = \exp(j*2*\pi*(F\_RF + FM\_sin\_TX)*t),$$

where F_RF signifies a carrier frequency of the frequency-modulated continuous-wave radar signal.

26. The radar apparatus as claimed in claim 24, wherein the pattern signal is based on the following representation:

$$TX\_corr = \exp(-j*2*\pi*FM\_sin\_TX*\tau),$$

where τ signifies a signal propagation time corresponding to the predefined distance.

27. A radar apparatus, comprising:
a transmitter configured to transmit a frequency-modulated continuous-wave radar signal, wherein the transmitter is configured to generate the continuous-wave radar signal with a continuously varying modulation frequency corresponding to a signal waveform which has a constant time derivative within a measurement interval;
a receiver configured to receive a reflection signal of the frequency-modulated continuous-wave radar signal, which is reflected by at least one object, and configured to mix the reflection signal with the frequency-modulated continuous-wave radar signal in order to obtain a baseband signal; and
a correlating device comprising a processing circuit, the correlating device configured to correlate the baseband signal with at least one pattern signal that is based on the continuously varying modulation frequency and a predetermined distance.

28. A radar method, comprising:
transmitting a frequency-modulated continuous-wave radar signal at a sinusoidally varying modulation frequency;
receiving a reflection signal of the frequency-modulated continuous-wave radar signal, which is reflected by at least one object;
mixing the reflection signal with the frequency-modulated continuous-wave radar signal in order to obtain a downmixed reception signal; and
correlating the downmixed reception signal with at least one pattern signal that is based on the sinusoidally varying modulation frequency and a predetermined distance.

* * * * *

UNITED STATES PATENT AND TRADEMARK OFFICE
CERTIFICATE OF CORRECTION

PATENT NO. : 12,196,848 B2  
APPLICATION NO. : 17/929190  
DATED : January 14, 2025  
INVENTOR(S) : Grigory Itkin Page 1 of 1

It is certified that error appears in the above-identified patent and that said Letters Patent is hereby corrected as shown below:

In the Claims

Claim 10:
Column 18, Line 1 change "frequency signal, to output a radio frequency signal at" to -- frequency signal, to output a radio frequency (RF) signal at --

Signed and Sealed this  
Sixteenth Day of September, 2025

Coke Morgan Stewart  
*Acting Director of the United States Patent and Trademark Office*